(12) United States Patent
Mortimer et al.

(10) Patent No.: US 7,476,017 B2
(45) Date of Patent: Jan. 13, 2009

(54) INTERMESHING KNEADER WITH TILTING MIXING CHAMBER

(76) Inventors: Jacques Mortimer, 1211 Ghent Hills Rd., Akron, OH (US) 44333; Shiro Hanada, 1 Anthony Dr., Farmingdale, OH (US) 11735; Wan I. Chang, No. 158, Hepping E. Rd., Yongkang City, Tainan County 710 (TW)

( * ) Notice: Subject to any disclaimer, the term of this patent is extended or adjusted under 35 U.S.C. 154(b) by 0 days.

(21) Appl. No.: 11/536,257

(22) Filed: Sep. 28, 2006

(65) Prior Publication Data
US 2007/0070802 A1 Mar. 29, 2007

Related U.S. Application Data

(60) Provisional application No. 60/596,510, filed on Sep. 29, 2005.

(51) Int. Cl.
B29B 7/20 (2006.01)
B29B 7/26 (2006.01)
B29B 7/82 (2006.01)

(52) U.S. Cl. ............ 366/76.7; 366/92; 366/147; 366/185

(58) Field of Classification Search .......... 366/45, 366/46, 76.1, 76.7, 76.8, 76.9, 76.93, 92, 366/97, 147, 154.1, 185; 425/583
See application file for complete search history.

(56) References Cited

U.S. PATENT DOCUMENTS

| | | | |
|---|---|---|---|
| 1,200,070 A | | 10/1916 | Banbury |
| 1,324,170 A | * | 12/1919 | Pletscher et al. ............ 366/77 |
| 1,905,755 A | * | 4/1933 | Banbury et al. ............ 366/76.7 |
| 2,015,618 A | | 9/1935 | Cook |
| 2,138,798 A | * | 11/1938 | Hooydonk .................. 366/185 |
| 2,495,241 A | * | 1/1950 | Eaby ........................ 366/76.7 |
| 2,495,242 A | * | 1/1950 | Jones ....................... 366/76.7 |
| 2,992,813 A | * | 7/1961 | Bonomo et al. .............. 366/97 |
| 3,100,064 A | * | 8/1963 | Kacena ..................... 222/166 |
| 3,572,645 A | * | 3/1971 | Matsuoka .................. 366/76.7 |
| 3,610,585 A | | 10/1971 | MacLeod et al. |
| 4,025,058 A | | 5/1977 | Mizuguchi |
| 4,058,297 A | * | 11/1977 | Seufert ...................... 366/81 |
| 4,260,264 A | | 4/1981 | Maki et al. |
| 4,284,358 A | | 8/1981 | Sato et al. |
| 4,455,091 A | * | 6/1984 | Bamberger et al. ........ 366/76.7 |
| 4,534,652 A | | 8/1985 | Stade |
| 4,557,630 A | | 12/1985 | Neil |
| 4,714,350 A | | 12/1987 | Nortey |
| 4,744,668 A | * | 5/1988 | Nortey ...................... 366/76.7 |

(Continued)

FOREIGN PATENT DOCUMENTS

DE 1 454 771 10/1969

(Continued)

*Primary Examiner*—Charles E Cooley
(74) *Attorney, Agent, or Firm*—Hahn Loeser & Parks LLP; Michael H. Minns

(57) ABSTRACT

A closed kneader mixing machine including a tilting mixing chamber and a pair of counter-rotating intermeshing rotors rotatably mounted within the tilting mixing chamber. Each rotor is a hollow cylinder having a spiral wing on the hollow cylinder with a pain of nogs proximate each end of the hollow cylinder. The counter-rotating intermeshing rotors may be synchronous rotors.

33 Claims, 10 Drawing Sheets

U.S. PATENT DOCUMENTS

| | | | | |
|---|---|---|---|---|
| 4,752,139 | A * | 6/1988 | Hauck | 366/298 |
| 4,775,240 | A * | 10/1988 | Passoni | 366/97 |
| 4,834,543 | A * | 5/1989 | Nortey | 366/97 |
| 4,854,711 | A * | 8/1989 | Hagan | 366/46 |
| 4,893,936 | A * | 1/1990 | Borzenski et al. | 366/76.7 |
| 4,914,635 | A | 4/1990 | Nishigai et al. | |
| 5,044,760 | A * | 9/1991 | Asai | 366/97 |
| 5,061,078 | A * | 10/1991 | Yada | 366/76.2 |
| 5,127,740 | A * | 7/1992 | DeBoer | 366/2 |
| 5,137,366 | A * | 8/1992 | Hill et al. | 366/47 |
| 5,180,225 | A | 1/1993 | Piccolo et al. | |
| 5,259,688 | A | 11/1993 | Piccolo et al. | |
| 5,273,356 | A | 12/1993 | Piccolo et al. | |
| 5,368,383 | A * | 11/1994 | Peter et al. | 366/97 |
| 5,460,445 | A * | 10/1995 | Miyoshi et al. | 366/76.7 |
| 5,516,206 | A * | 5/1996 | Seide et al. | 366/76.7 |
| 5,520,455 | A * | 5/1996 | Yamada et al. | 366/97 |
| 5,529,390 | A * | 6/1996 | Giani et al. | 366/76.6 |
| 5,914,148 | A | 6/1999 | Kazemzadeh | |
| 5,984,516 | A * | 11/1999 | Inoue et al. | 366/97 |
| 6,402,360 | B1 | 6/2002 | Nortey | |
| 6,422,733 | B1 * | 7/2002 | Adams et al. | 366/76.7 |
| 6,494,607 | B2 * | 12/2002 | Valsamis et al. | 366/84 |
| 6,811,295 | B2 * | 11/2004 | Koro et al. | 366/97 |
| 6,908,221 | B2 | 6/2005 | Proni et al. | |
| 6,913,379 | B2 * | 7/2005 | Otsuka et al. | 366/76.7 |
| 7,063,454 | B2 * | 6/2006 | Murakami et al. | 366/147 |
| 7,165,877 | B2 * | 1/2007 | Lang | 366/26 |
| 2002/0163852 | A1 * | 11/2002 | Valsamis et al. | 366/84 |
| 2004/0179424 | A1 * | 9/2004 | Yamada et al. | 366/76.8 |
| 2004/0240310 | A1 * | 12/2004 | Lang | 366/46 |
| 2005/0111295 | A1 * | 5/2005 | Drocco | 366/97 |
| 2005/0276157 | A1 * | 12/2005 | Murakami et al. | 366/147 |
| 2006/0034146 | A1 * | 2/2006 | Lang | 366/26 |
| 2006/0104154 | A1 * | 5/2006 | Inoue et al. | 366/96 |
| 2007/0070802 | A1 * | 3/2007 | Mortimer et al. | 366/76.7 |
| 2007/0171766 | A1 * | 7/2007 | Loiselet | 366/92 |
| 2007/0177450 | A1 * | 8/2007 | Borzenski et al. | 366/76.7 |
| 2007/0291579 | A1 * | 12/2007 | Huffstetler et al. | 366/97 |

FOREIGN PATENT DOCUMENTS

| | | | |
|---|---|---|---|
| DE | 3426442 C | * | 12/1985 |
| EP | 84426 A2 | * | 7/1983 |
| EP | 0 170 397 | | 3/1990 |
| EP | 530557 A1 | * | 3/1993 |
| EP | 995564 A1 | * | 4/2000 |
| GB | 2 028 153 | | 3/1980 |
| GB | 2231503 A | * | 11/1990 |
| JP | 61167433 A | * | 7/1986 |
| JP | 04062005 A | * | 2/1992 |
| JP | 07124941 A | * | 5/1995 |
| JP | 07303824 A | * | 11/1995 |
| JP | 08038869 A | * | 2/1996 |
| JP | 08258040 A | * | 10/1996 |
| JP | 09220456 A | * | 8/1997 |
| JP | 10119035 A | * | 5/1998 |
| JP | 10244143 A | * | 9/1998 |
| JP | 2006167618 A | * | 6/2006 |
| WO | 9635507 | * | 11/1996 |
| WO | 0073033 | | 12/2000 |

* cited by examiner

INTERMESHING KNEADER WITH TILTING MIXING CHAMBER

This application claims priority to provisional application Ser. No. 60/596,510, filed Sep. 29, 2005, the disclosure of which is hereby incorporated by reference.

BACKGROUND OF THE INVENTION

This invention relates generally to batch type polymer mixers and more particularly to a kneader mixer with intermeshing rotors.

There are two different types of internal mixers used in the industry at large. The first type is more commonly known as a "Banbury" type intensive mixer and the second type is known as a "Kneader". The primary difference between the two types of mixers is the rotor, throat, chamber and floating weight design. Banbury® mixers also discharge the batch through a bottom door where as the kneader tilts to discharge the batch.

A closed kneader is composed of a kneading tank or chamber for holding kneaded material, a pair of rotors, which are provided at both ends with rotor drive shafts passing through side walls of the chamber, and which consist of a rotor shaft forming a rotor blade for kneading the material kneaded in the chamber, and a pressure cover. When kneading material, the kneaded material is poured into the chamber when the pressure cover is opened upward. The pressure cover is let down and the rotors are rotatably driven with a driving means such as a motor, etc., connected, to the rotor drive shafts.

Traditional kneaders have two counter rotating rotors with each mixing rotor having two thin wings affixed on it. The two wing rotors typically rotate at different speeds through connecting gears. The wings move material from one portion of the chamber to the other while also providing material movement along the rotor axis. These kneaders do not have intermeshing rotors and therefore can have differential rotor speeds.

Typically, conventional kneaders have a one piece rotor design that includes a rotor shaft with two wings welded on the shaft. The conventional kneader's blades are typically long, high and narrow. Water cooling is provided through a passage in the rotor shaft and small jackets in each wing. This cooling method is usually not sufficient for single pass mixing.

During kneading, heat is produced within the kneaded material, in the chamber and also by the rotor shaft because of internal heat generation due to shearing, dispersion, etc., during kneading. For these reasons, insufficient cooling often occurs in the inner part of the kneaded material with respect to the kneading speed, i.e., the speed of heat generation, in the case of a kneaded material of large thickness and low thermal conductivity (especially rubber, etc.), even if cooling water is circulated through the chamber wall and the rotor shaft.

While sufficient cooling can be provided for the kneaded material with little increase of internal temperature in the kneaded material by using a kneader with a small mixing volume, such a machine is inferior in productivity and therefore unrealistic as a mass production unit.

In the closed kneader, while a general kneading process is divided into a primary kneading for mixing without containing any vulcanizing agent, and a secondary kneading for performing kneading by mixing the kneaded material, which has already been subjected to a certain kneading process in the primary kneading, with a vulcanizing agent, the kneading material temperature must be kept below a certain level (variable depending on the material) for mixing in the vulcanizing agent.

Generally, convention kneaders require processing a batch in two passes. Either by stopping the mixing and allowing the batch to cool before completing the mixing, or by discharging the batch into a second kneader.

Conventional kneaders typically use pneumatic pressure to push the batch down into the rotors and mixing chamber with a floating weight (ram). This pneumatic system can be unreliable and inconsistent. The pneumatic ram moves uncontrollably with the ram position being typically controlled by the rotor dragging force as well as the size of rubber or polymer pieces being forced into the rotors.

The foregoing illustrates limitations known to exist in present kneader mixers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

A closed kneader mixing machine is disclosed that comprises: a tilting mixing chamber having an open upper end; a pair of counter-rotating intermeshing rotors rotatably mounted within the tilting mixing chamber. The intermeshing rotors may also be synchronous.

The closed kneader mixing machine rotors may be formed from a hollow cylinder with a spiral wing extending radially outward from the outer surface of the hollow cylinder. The spiral wing can extend from one end of the hollow cylinder towards the other end of the hollow cylinder. The spiral wing has a width that is greater than the radial extent of the spiral wing. The rotor may further include poly-sided nogs on the hollow cylinder. In one embodiment, a pair of poly-sided nogs are provided. The poly-sided nogs may have a pentagon shape. Nogs of other shapes may be provided on the rotor.

The rotor may have a spiral cooling groove on an interior surface thereof. The spiral cooling groove may further extend into at least one of the spiral wing and at least one nog.

In addition, a closed kneader mixing machine is disclosed that comprises: a tilting mixing chamber tiltable between an upright position and a tilted downward discharge position; and at least one hydraulic locking pin engaging the tilting mixing chamber when the tilting mixing chamber is in the upright position.

In one embodiment, the mixing chamber comprises two semi-circular sub-chambers and the radius of each rotor being about 60 to about 80%, or about 70% of the sub-chamber radius. Alternatively, or in addition, each rotor has a wing extending radially towards the other rotor to between 3 mm and 6 mm of the outer surface of the other rotor, or to between 3 mm and 14 mm of the outer surface of the other rotor.

Alternatively, this may be accomplished by providing a closed kneader mixing machine comprising: a tilting mixing chamber tiltable between an upright position and a tilted downward discharge position, the tilting mixing chamber having an open upper end; a movable ram, the movable ram being movable between a position closing the tilting mixing chamber open upper end and a position distal the tilting mixing chamber open upper end; and a hydraulic operator biasing the movable ram to the position closing the tilting mixing chamber open upper end.

In a further disclosed embodiment, this is accomplished by providing a closed kneader mixing machine comprising: a tilting mixing chamber having an open upper end, the tilting mixing chamber comprising two semi-circular sub-chambers, each sub-chamber having a radius; and a pair of counter-rotating intermeshing rotors rotatably mounted within the tilting mixing chamber, each rotor having radius, the rotor radius being between about 60% and 80% of the sub-chamber radius.

In yet another disclosed aspect of the present intermeshing kneader, this is accomplished by providing a closed kneader mixing machine comprising: a tilting mixing chamber having an open upper end; a pair of counter-rotating intermeshing rotors rotatably mounted within the tilting mixing chamber, each rotor comprising a hollow cylinder having a spiral groove on an inside surface of the hollow cylinder; and a source of cooling liquid, the source of cooling liquid being in fluid communication with each rotor hollow cylinder spiral groove.

In a further embodiment of the disclosed kneader mixer, this is accomplished by providing a closed kneader mixing machine comprising: a tilting mixing chamber having an open upper end, the mixing chamber having a predetermined volume; a pair of counter-rotating intermeshing rotors rotatably mounted within the tilting mixing chamber; and a motor drivingly engaging the rotors to rotate the rotors, the motor comprising 3 to 7 HP/liter of mixing chamber volume.

In yet a further alternate aspect of the disclosed kneader this is accomplished by providing a mixing and kneading device having a pair of rotors, each rotor comprising: a hollow cylinder; a spiral wing on the hollow cylinder, the spiral wing extending radially outward from an outer surface of the hollow cylinder and extending axially in a spiral manner from one end of the hollow cylinder towards the other end of the cylinder; and a pair of poly-sided nogs on the hollow cylinder, each poly-sided nog extending radially outward from the outer surface of the hollow cylinder, a poly-sided nog being proximate each end of the hollow cylinder. The pair of rotors can be intermeshing rotors, and further, can be synchronous rotors. The nogs may have other shapes than poly-sided.

BRIEF DESCRIPTION OF THE DRAWING FIGURES

DETAILED DESCRIPTION

Figure 1A:
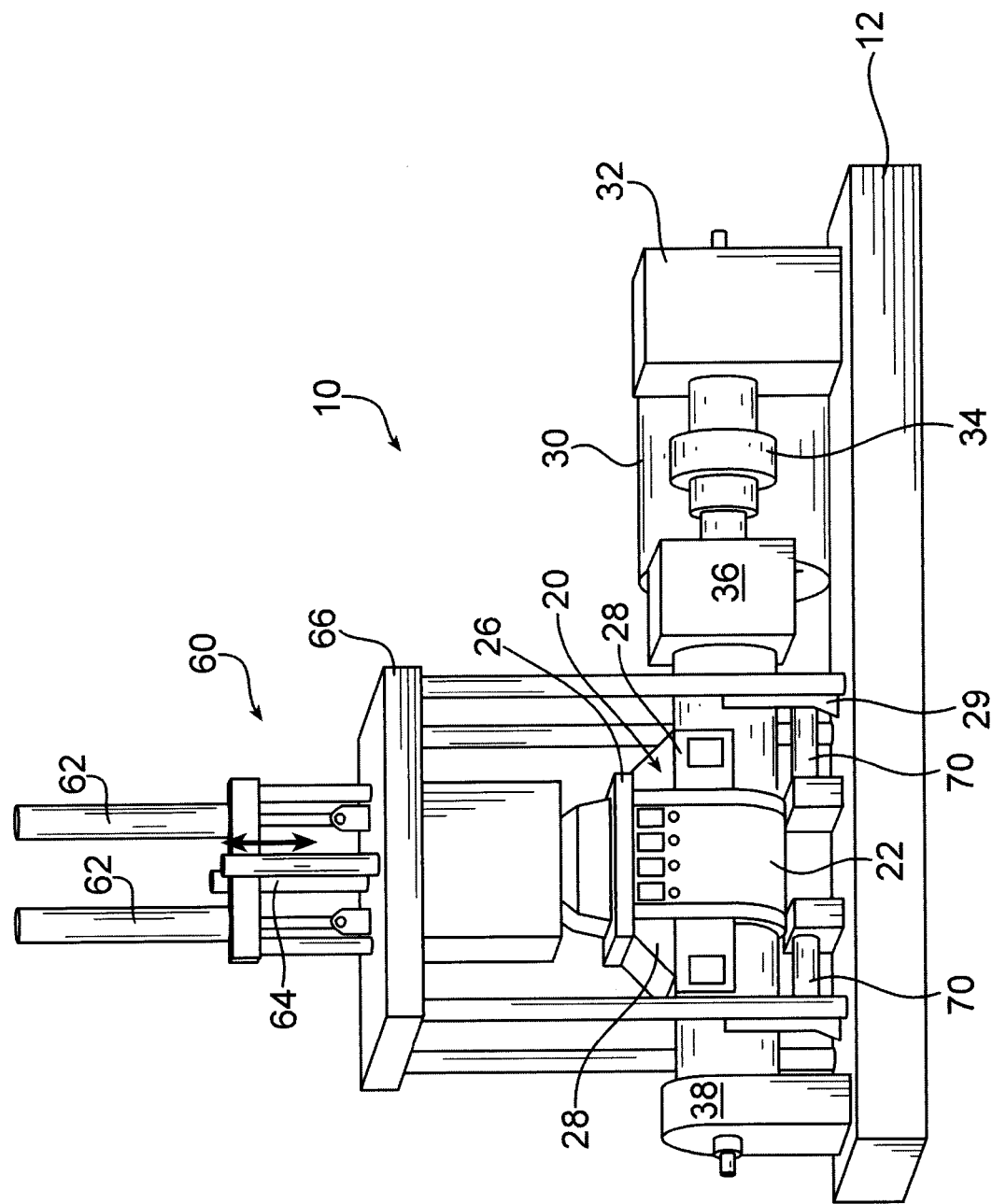
FIG. 1A is a perspective view of illustrating an intermeshing rotor kneader mixer.

Referring to the figures, a batch type or closed kneader mixer 10 that consists of a mixing chamber 20, two intermeshing mixing rotors 40 within the mixing chamber 20, and a movable hydraulically driven ram 24 in the top of the mixing chamber 20 is shown. The hydraulically driven ram 24 moves between an open position, where material can be added to the mixing chamber 20 and a closed position, closing the open upper end 25 of the lower mixing chamber 22 for mixing the added material. The mixing chamber 20 is designed to house the two rotors 40, which intermesh each other while co-rotating opposite directions. The hydraulic ram 24 applies a controlled pressure on the batch while mixing. The batch is discharged by raising the ram 24 and then rotating the chamber 20 downward up to 180 degrees to a tilted discharge position, as shown in FIG. 1B.

Figure 1B:
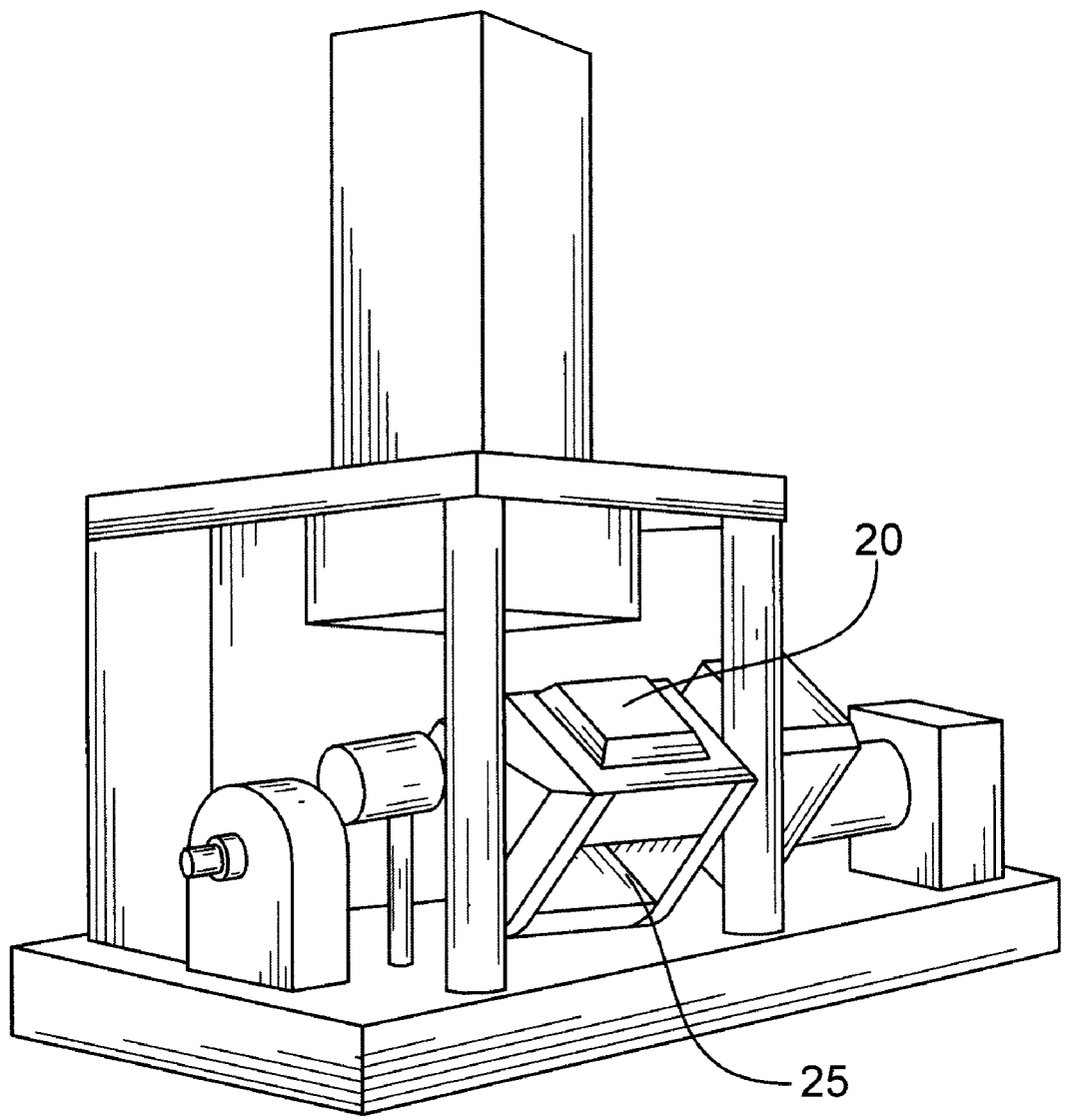
FIG. 1B is a second perspective view of the intermeshing rotor kneader shown in FIG. 1A.
Figure 2:
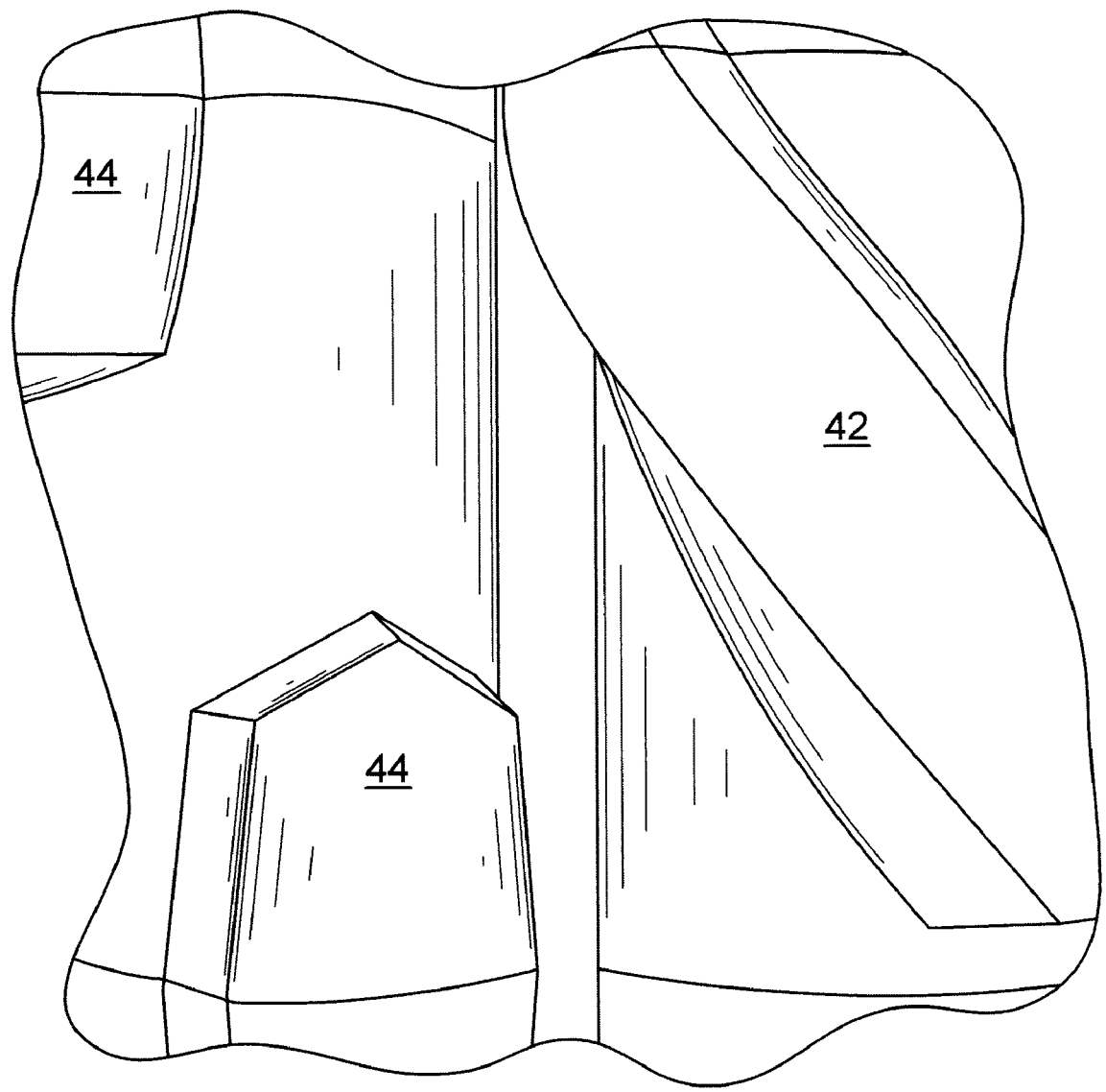
FIG. 2 is a perspective view of an intermeshing rotor for use with the mixer shown in FIG. 1A.
Figure 3:
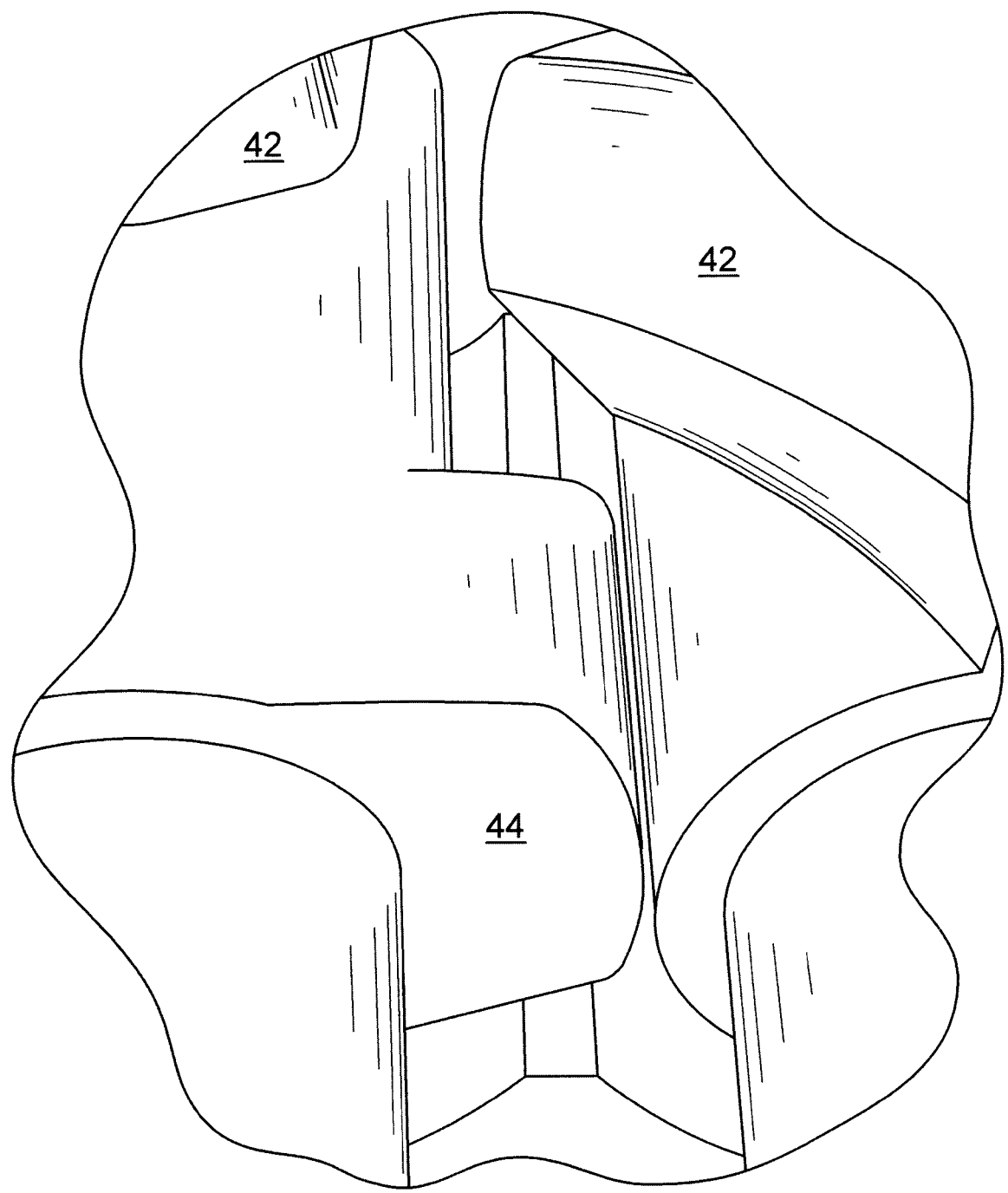
FIG. 3 is a second perspective view of the intermeshing rotor shown in FIG. 2.
Figure 4A:
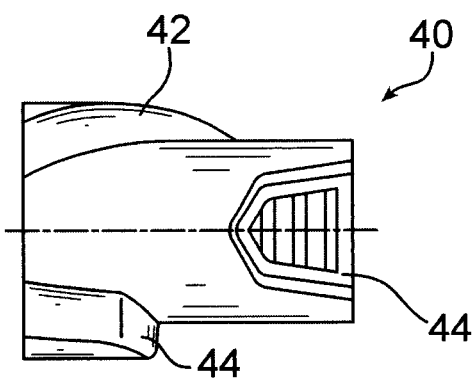
FIG. 4A is a first side view of the intermeshing rotor shown in FIG. 3.
Figure 4B:
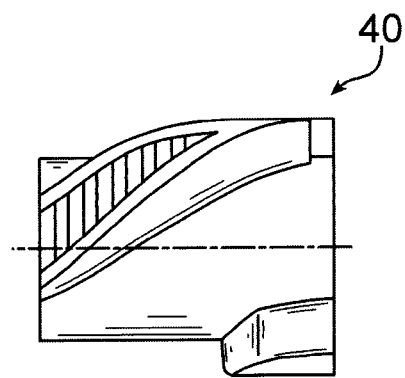
FIG. 4B is a second side view of the intermeshing rotor shown in FIG. 3.
Figure 4C:
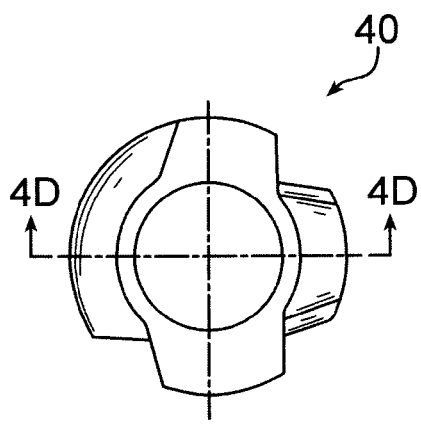
FIG. 4C is an end view of the intermeshing rotor shown in FIG. 3.
Figure 4D:
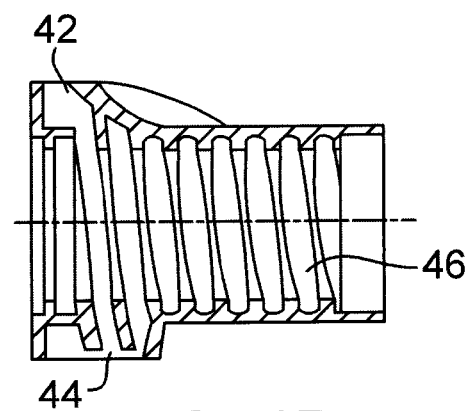
FIG. 4D is a cross-sectional view taken on line 4D-4D of FIG. 4C.
Figure 4E:
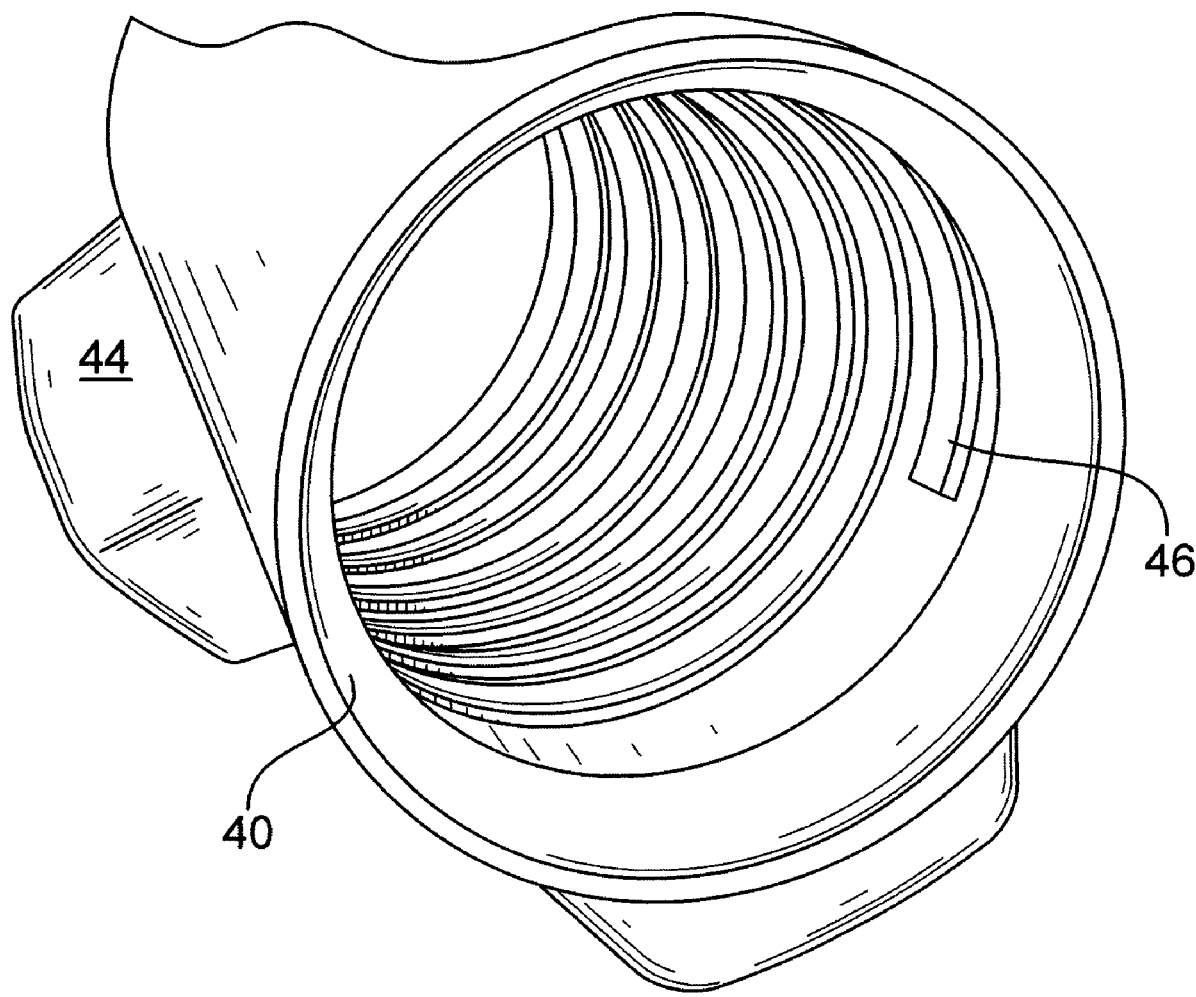
FIG. 4E is a perspective view of the interior of the intermeshing rotor shown in FIG. 3.
Figure 7:
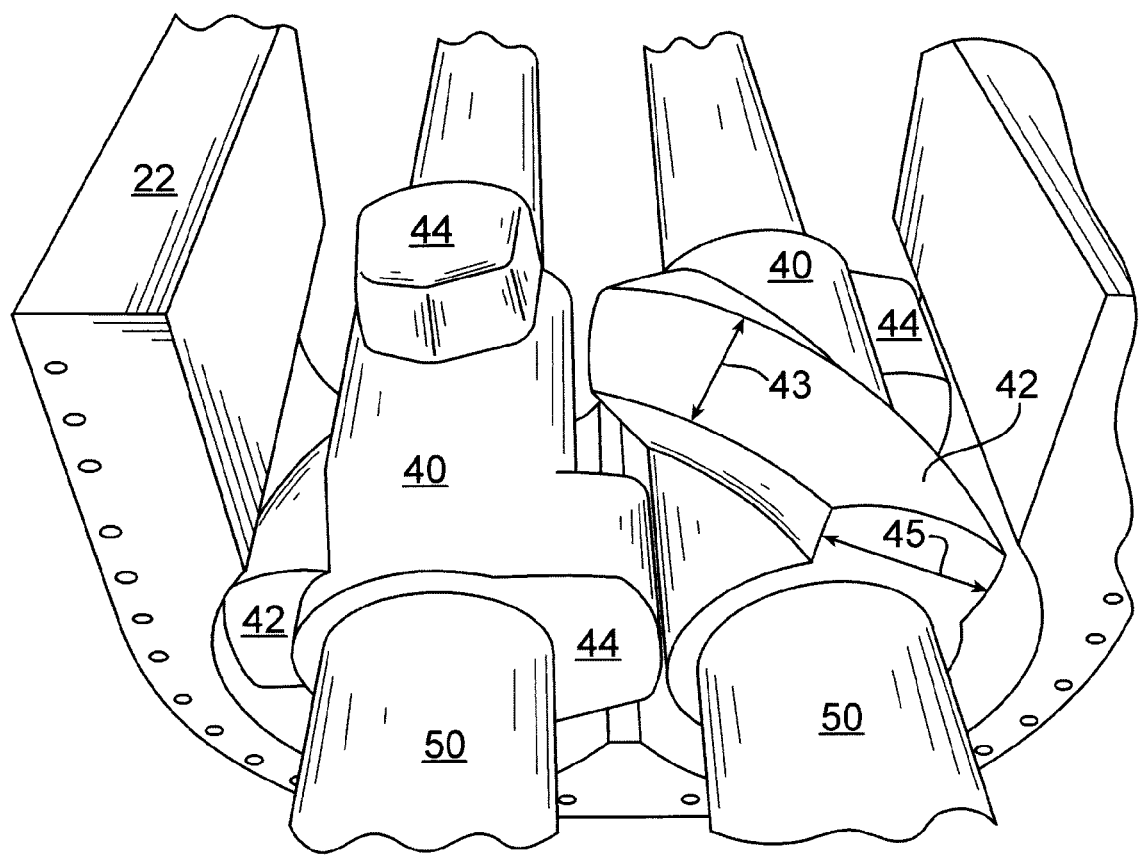
FIG. 7 is a perspective view of a pair of intermeshing rotors within the lower housing of the intermeshing kneader shown in FIG. 1A.
Figure 8:
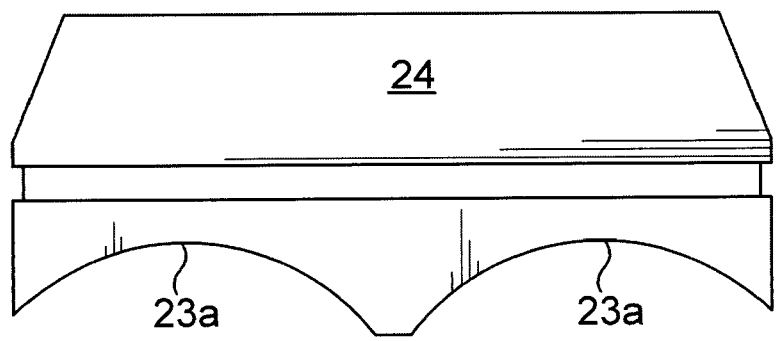
FIG. 8 is a front view of the ram of the intermeshing kneader shown in FIG. 1A.
Figure 9:
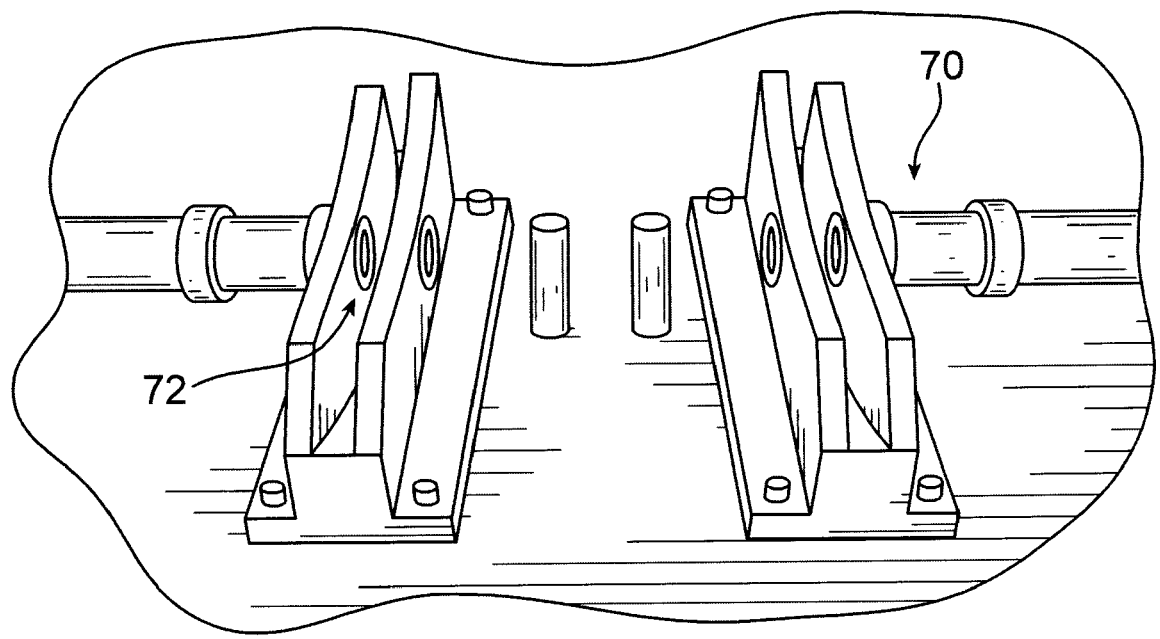
FIG. 9 is perspective view shown details of a hydraulic locking mechanism for engaging the lower housing shown in FIG. 6.

One embodiment of the mixer 10 is shown in FIG. 1A. In this embodiment, the components of the mixer 10 are mounted on a single support base 12. The mixing chamber 20 includes a lower mixing chamber 22 with an upper housing 26 within which the hydraulically ram 24 is mounted. The intermeshing rotors 40 are mounted on rotor shafts 50 and positioned within the lower mixing chamber 22 (see FIG. 7). The lower mixing chamber 22 is divided into two semi-circular sub-chambers 23. At each end of the lower mixing chamber 22, end plates 28 enclose the ends of the lower mixing chamber 22 and hold seals through which the rotor shafts 50 pass. The rotor shafts 50 are supported by bearing supports 29.

When ram 24 is in the closed position, the lower part of ram 24 in conjunction with the lower mixing chamber 22 forms the mixing chamber 20. On the lower surface of ram 24 are two semi-circular surfaces 23a that form, along with the lower mixing chamber 22, the sub-chambers 23.

The intermeshing rotors 40 are driven by a motor 30 mounted to support base 12. The motor 30 is connected to the rotor shafts 50 through a reducer 32 connected to the motor shaft (not shown). The reducer 32 connects to the rotor shafts 50 through a drive coupling 34 connected to drive gears 36. The drive gears 36 rotate the intermeshing rotors 40 at the same speed in opposite directions.

The mixing chamber 20 is mounted to support base 12 for tilting to a discharge position (see FIG. 1B). A tilting gear 38 drives or tilts the mixing chamber 20 to the discharge position, about 135° from a vertical or upright position.

The disclosed kneader mixer seeks to achieve single pass mixing through the rotor and hydraulic ram design. With the conventional kneader design, the temperature in a batch can typically not be sufficiently controlled to achieve one-pass mixing. With conventional kneaders the batch temperature after the primary kneading stage is too high because of poor temperature transfer from the mixing contact surfaces to the batch. Therefore the batch has to be either cooled down or transferred to another kneader for the final kneading stage. This additional step is cost prohibitive as well as time consuming.

Kneader mixer 10 also seeks to impart superior dispersion by reducing filler particle size during the kneading process. The reduction of particle size is achieved by the intermeshing rotor design.

Figure 5:
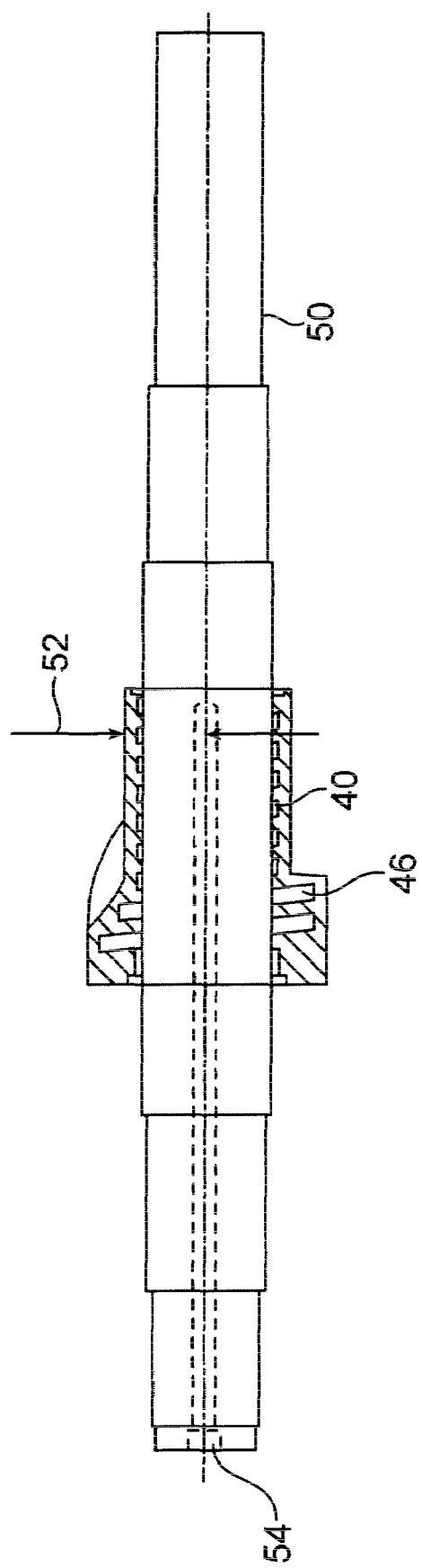
FIG. 5 is a cross-section view of the intermeshing rotor shown in FIG. 3 mounted on a rotor shaft.

The kneader mixer 10 uses a two piece rotor design, see FIG. 5. An oversized rotor shaft 50 and a cast blade shell portion or hollow cylinder 40. The cast blade shell or rotor 40 is provided with an internal spiral water passage or spiral groove 46 on an inside surface thereof, which is close to the material contact surfaces. The assembled rotor has a much larger outside diameter than conventional kneaders. This allows for more cooling surface as well as larger mixing surfaces.

In one embodiment, the kneader mixer 10 has a rotor shaft with one long wing (blade) 42 and two nogs (small blades) 44 for mixing. The rotor has much wider land width 43 and is stubby in shape. The much wider rotor tip (land width) 43 greatly enhances the dispersion effect. The materials are subjected to a larger smearing action of the batch between the wide rotor tip and chamber wall as well as between the rotor tip and the opposite rotor shaft. In the non-intermeshing type kneader, no mixing occurs between the rotor tip and rotor shaft due to the non-intermeshing design. The nogs 44 may have a poly-sided shape.

The disclosed intermeshing rotor design has less fluid volume capacity than convention kneaders due to the larger rotor outside diameter and intermeshing blades. This is usually not desirable because the batch will be smaller in size. The intermeshing design however compensates for the smaller batch size in much shorter mixing cycles, better batch consistency and 1 pass mixing.

Kneader mixer 10 imparts superior cooling on the batch that allows rubber curing agents to be added in the primary mixing cycle without having to cool the batch before adding the curing agents to the rubber. In one embodiment, the rotor shaft radius 52 is about 70% of the mixing chamber or subchamber radius 27 and the rotor tip width 43 is about 15% to about 30% of the rotor diameter, or the rotor tip width 43 may be ~20% to ~25% of the rotor diameter. The intermeshing blades or wings 42 have about a 3 to 14 mm rotor tip clearance to opposite rotor shaft, or a clearance of about 3 to 6 mm. The intermeshing rotors 40 should rotate at the same speed to avoid damage to the rotors. The poly-sided mixing rotor nogs 44 should be proximate the ends of the rotor 40 and preferably are pentagon shaped with appropriate angles to maximize material flow. The spiral long blade or wing 42 should start from one rotor end but not span the entire rotor length. The blade 42 should spiral around the rotor 40 and may preferably terminate at least 1" (25 mm) from the other end of the rotor 40. This design facilitates proper material flow as well as reducing pressure on the rotor dust seals. This design also increases the fluid volume in the mixing chamber.

In one embodiment, the spiral cooling groove 46 extends into the wing 42 and nogs 44. As shown in the figures, the spiral wing 42 extends radially outward from the surface of the rotor 40. The width 43 of wing 42 is greater than the amount the wing 42 extends outward of the rotor 40. The wing 42 spirals about 90° around the rotor 40. In addition, one nog 44 is angularly offset about 90° from the other nog 44. Also, nog 44 that is at the same end of the rotor 40 from which the wing 42 extends is angularly offset about 90° from that end of the wing 42.

Each shaft 50 includes an internal cooling liquid passage 54 that connects with spiral cooling passage 46 to provide cooling liquid to the interior of rotor 40 and to the exterior surfaces of rotor 40 that contact the material being mixed.

Another embodiment uses a hydraulic ram drive 60 for driving ram 24. Typical pneumatic rams are uncontrolled and, therefore, the ram position is controlled by the rotor dragging force as well as the size of rubber pieces being forced into the rotors. The hydraulic ram drive 60 exerts positive pressure on the batch and can be accurately controlled in the desirable position, which leads to improved mixing and improved batch to batch consistency. The hydraulic ram drive 60 comprises two hydraulic cylinders or operators 62 with a guide rod 64 in the middle to which the ram 24 is affixed. This arrangement assures that in the event of an oil leak in the hydraulic ram drive 60 the batch will not be contaminated with oil. The hydraulic cylinders 62 are located on a platform 66 on top of the mixer frame and outside the mixing chamber 20 to prevent oil leaking into the mixing chamber.

A further embodiment includes hydraulic chamber pin locks 70. Due to the high horsepower requirement to drive the intermeshing rotors 40, the tilting mixing chamber 20 will tend to rock back and forth due to extreme pressures inside the chamber. Two hydraulic chamber pins 72 extend to lock the mixing chamber 20 in position to prevent chamber movement.

In one embodiment, a motor 30 is used that provides 3 to 7 horsepower per liter of mixing chamber 20 volume. In one particular embodiment, a motor having 6 HP/L of mixing chamber volume is used. This is much greater horsepower than is typically used for closed kneader mixers. For the 50 L mixing chamber 20 shown in the drawings, the 300 HP motor 30 increases the mixing intensity and can reduce the required mixing time.

Figure 6:
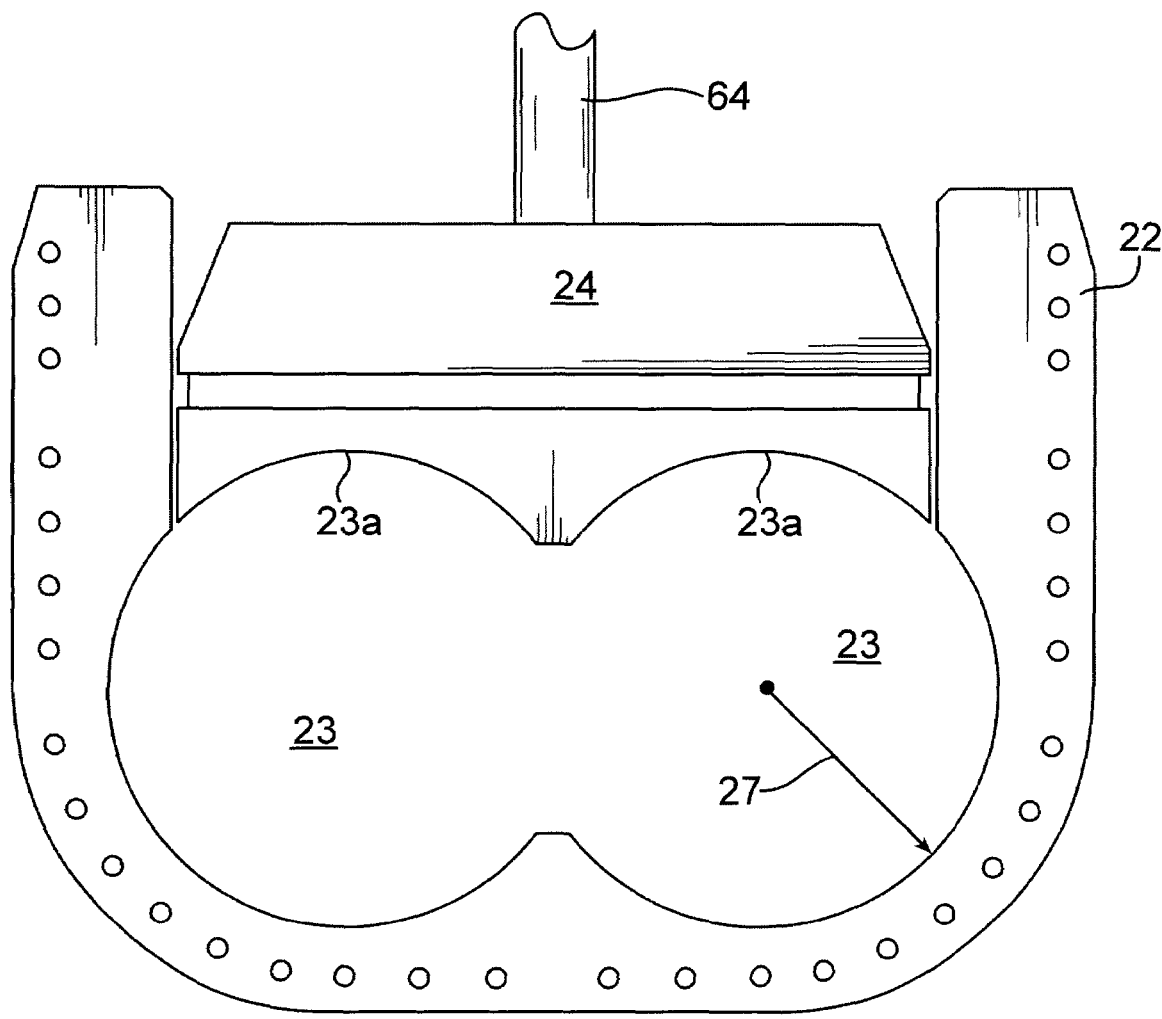
FIG. 6 is an end view of the lower housing of the intermeshing kneader shown in FIG. 1A.

The mixing chamber 20 volume includes the volume enclosed by the lower mixing chamber 22 and the ram 24, (when the ram 24 is in the closed position, see FIG. 6), and the two chamber end plates 28.

What is claimed is:

1. A closed kneader mixing machine comprising:
   a tilting mixing chamber having an open upper end;
   a pair of counter-rotating intermeshing rotors rotatably mounted within the tilting mixing chamber, each rotor comprising:
   a hollow cylinder;
   a spiral wing on the hollow cylinder, the spiral wing extending radially outward from an outer surface of the hollow cylinder and extending axially in a spiral manner from one end of the hollow cylinder towards the other end of the cylinder; and
   a pair of nogs on the hollow cylinder, each nog extending radially outward from the outer surface of the hollow cylinder, a nog being proximate each end of the hollow cylinder.

2. The closed kneader mixing machine as claimed in claim 1 where the pair of counter-rotating intermeshing rotors are synchronous rotors.

3. The closed kneader mixing machine as claimed in claim 1, wherein the inside of the hollow cylinder comprises a spiral groove.

4. The closed kneader mixing machine as claimed in claim 3, wherein the spiral groove extends into at least one of the spiral wing and at least one nog.

5. The closed kneader mixing machine as claimed in claim 3 further comprising a source of cooling liquid, the source of cooling liquid being in fluid communication with each rotor spiral groove.

6. The closed kneader mixing machine as claimed in claim 1, wherein the spiral wing has a radial dimension extending from the outer surface of the hollow cylinder and a width extending from one side of the spiral wing to the other side of the spiral wing, the width being greater the radial dimension.

7. The closed kneader mixing machine as claimed in claim 6, wherein each rotor has a diameter, the spiral wing width being between about 15% and about 30% of the rotor diameter.

8. The closed kneader mixing machine as claimed in claim 7, wherein each rotor has a diameter, the spiral wing width being between about 20% and about 25% of the rotor diameter.

9. The closed kneader mixing machine as claimed in claim 1, wherein the spiral wing spirals about 90° about the hollow cylinder.

10. The closed kneader mixing machine as claimed in claim 1, wherein one nog is offset angularly about 90° to the other nog.

11. The closed kneader mixing machine as claimed in claim 1, wherein a nog is offset angularly about 90° from the end of the spiral wing proximate the same end of the hollow cylinder the nog is proximate to.

12. The closed kneader mixing machine as claimed in claim 1, wherein each nog has a poly-sided shape.

13. The closed kneader mixing machine as claimed in claim 12, where each poly-sided nog has a pentagon shape.

14. The closed kneader mixing machine as claimed in claim 1 where the tilting mixing chamber comprises two semi-circular sub-chambers, each sub-chamber having a radius; and
    each rotor has a radius, the rotor radius being between about 60% and about 80% of the sub-chamber radius.

15. The closed kneader mixing machined as claimed in claim 14 where each rotor has a radius, the rotor radius being about 70% of the sub-chamber radius.

16. The closed kneader mixing machine as claimed in claim 1, the spiral wing extending radially outward from the rotor, the outermost radial extent of the spiral wing on one rotor extending to between 6 mm and 14 mm of the other rotor.

17. The closed kneader mixing machine as claimed in claim 16 where the outermost radial extent of the at least one wing on one rotor extends to between 3 mm and 6 mm of the other rotor.

18. The closed kneader mixing machine as claimed in claim 1 where further comprising a motor drivingly engaging the rotors to rotate the rotors, and
    the tilting mixing chamber has a volume, the motor providing between about 3 and about 7 horsepower per liter of tilting mixing chamber volume.

19. The closed kneader mixing machine as claimed in claim 18 where the motor provides about 6 horsepower per liter of tilting mixing chamber volume.

20. The closed kneader mixing machine as claimed in claim 1 where the tilting mixing chamber is tiltable between an upright position and a tilted downward discharge position; and
    at least one hydraulic locking pin engaging the tilting mixing chamber when the tilting mixing chamber is in the upright position.

21. The closed kneader mixing machine as claimed in claim 1 further comprising
    a movable ram, the movable ram being movable between a position closing the tilting mixing chamber open upper end and a position distal the tilting mixing chamber open upper end.

22. The closed kneader mixing machine as claimed in claim 21 further comprising
    a hydraulic operator biasing the movable ram to the position closing the tilting mixing chamber open upper end.

23. A mixing and kneading device comprising:
    a mixing chamber having an open upper end;
    a pair of counter-rotating intermeshing rotors rotatably mounted within the mixing chamber, each rotor comprising:
    a hollow cylinder;
    a spiral wing on the hollow cylinder, the spiral wing extending radially outward from an outer surface of the hollow cylinder and extending axially in a spiral manner from one end of the hollow cylinder towards the other end of the hollow cylinder; and
    a pair of nogs on the hollow cylinder, each nog extending radially outward from the outer surface of the hollow cylinder, a nog being proximate each end of the hollow cylinder.

24. The mixing and kneading device according to claim 23, wherein the inside of the hollow cylinder comprises a spiral groove.

25. The mixing and kneading device according to claim 24, wherein the spiral groove extends into at least one of the spiral wing and at least one nog.

26. The mixing and kneading device according to claim 23, wherein the spiral wing has a radial dimension extending from the outer surface of the hollow cylinder and an width extending from one side of the spiral wing to the other side of the spiral wing, the width being greater the radial dimension.

27. The mixing and kneading device according to claim 26, wherein each rotor has a diameter, the spiral wing width being between about 15% and about 30% of the rotor diameter.

28. The mixing and kneading device according to claim 23, wherein the spiral wing spirals about 90° about the hollow cylinder.

29. The mixing and kneading device according to claim 23, wherein one nog is offset angularly about 90° to the other nog.

30. The mixing and kneading device according to claim 23, wherein a nog is offset angularly about 90° from the end of the spiral wing proximate the same end of the hollow cylinder the nog is proximate to.

31. The mixing and kneading device according to claim 23, where each nog has a poly-sided shape.

32. The mixing and kneading device according to claim 31, wherein each poly-sided nog has a pentagon shape.

33. A closed kneader mixing machine comprising:
    a tilting mixing chamber having an open upper end;
    a pair of counter-rotating intermeshing rotors rotatably mounted within the tilting mixing chamber, each rotor comprising a hollow cylinder having a spiral groove on an inside surface of the hollow cylinder; and
    a source of cooling liquid, the source of cooling liquid being in fluid communication with each rotor spiral groove.

* * * * *